United States Patent
Calvo Lance et al.

(10) Patent No.: US 11,108,889 B2
(45) Date of Patent: Aug. 31, 2021

(54) AUTOMATICALLY RESOLVING, WITH REDUCED USER INPUTS, A SET OF ACTIVITY INSTANCES FOR A GROUP OF USERS

(71) Applicant: Google LLC, Mountain View, CA (US)

(72) Inventors: Marcos Calvo Lance, Zurich (CH); Philip Koonce, Zurich (CH)

(73) Assignee: GOOGLE LLC, Mountain View, CA (US)

(*) Notice: Subject to any disclaimer, the term of this patent is extended or adjusted under 35 U.S.C. 154(b) by 91 days.

(21) Appl. No.: 16/617,367

(22) PCT Filed: Aug. 22, 2018

(86) PCT No.: PCT/US2018/047616
§ 371 (c)(1),
(2) Date: Nov. 26, 2019

(87) PCT Pub. No.: WO2020/040762
PCT Pub. Date: Feb. 27, 2020

(65) Prior Publication Data
US 2020/0344327 A1    Oct. 29, 2020

(51) Int. Cl.
*H04L 29/06* (2006.01)
*G06F 9/451* (2018.01)
(Continued)

(52) U.S. Cl.
CPC .......... *H04L 67/42* (2013.01); *G06F 3/0482* (2013.01); *G06F 9/452* (2018.02); *G06N 20/00* (2019.01); *G06Q 50/30* (2013.01); *H04L 67/10* (2013.01)

(58) Field of Classification Search
CPC ......... H04L 67/42; H04L 67/10; G06F 9/452; G06F 3/0482; G06N 20/00; G06Q 50/30
(Continued)

(56) References Cited

U.S. PATENT DOCUMENTS 10,331,221 B2 * 6/2019 Churchill ............... G06N 20/00
2006/0242232 A1 10/2006 Murillo et al.
(Continued)

FOREIGN PATENT DOCUMENTS

WO   2011088053 A2   7/2011

OTHER PUBLICATIONS

Korean Intellectual Property Office; International Search Report and Written Opinion of Ser. No. PCT/US2018/047616; 13 pages; dated May 14, 2019.

*Primary Examiner* — William D Titcomb
(74) *Attorney, Agent, or Firm* — Middleton Reutlinger

(57) ABSTRACT

Automatically determining, with reduced (or no) input from the users of a group, a set of activity instances that the group of users has interest in performing. A representation of the set of activity instances can be rendered for consideration by a group, and the set of activity instances can be determined even when only limited criteria are specified. Optionally, in response to affirmative user interface input(s) directed to a rendered representation of the set of activity instances, one or more of the activity instances of the set can be confirmed through limited input(s) of one or more users of the group. Further, the automatic determination of the set of activity instances is optionally performed using one or more trained machine learning models that are trained to optimize a likelihood that the users of the group will find the set satisfactory.

19 Claims, 6 Drawing Sheets

(51) Int. Cl.
  *G06N 20/00* (2019.01)
  *G06F 3/0482* (2013.01)
  *G06Q 50/30* (2012.01)
  *H04L 29/08* (2006.01)

(58) Field of Classification Search
  USPC .......................................................... 709/206
  See application file for complete search history.

(56) References Cited

U.S. PATENT DOCUMENTS

| | | |
|---|---|---|
| 2010/0223212 A1 | 9/2010 | Manolescu et al. |
| 2010/0223341 A1 | 9/2010 | Manolescu et al. |
| 2014/0032452 A1* | 1/2014 | Perkowitz ................ G06N 5/04 706/12 |
| 2015/0163453 A1 | 6/2015 | Wood et al. |
| 2016/0080304 A1 | 3/2016 | Hamlin et al. |
| 2016/0321560 A1* | 11/2016 | Nakhayi Ashtiani .. G06N 20/00 |
| 2016/0358065 A1* | 12/2016 | Gedge ...................... G06N 7/00 |
| 2017/0140285 A1* | 5/2017 | Dotan-Cohen ......... H04W 4/02 |
| 2019/0034963 A1* | 1/2019 | George ................... G06N 5/04 |

* cited by examiner

305

| |
|---|
| Alice: Hey, let's go to a movie on Friday |
| Bob: Good idea. How about Horror Movie 1? |
| Chris: Can we go to dinner too? |
| Alice: That's fine with me. |
| Bob: Me too |

310

I have the following activity listing for you:

Movie: Horror Movie 1
Time:   5:30 PM-7:00 PM
Location: Main Street Theater

Dinner: Joe's Steakhouse
Time: 7:30PM reservation available
Location: 123 Main Street Would you like to purchase tickets?   [ YES ]   [ NO ]

315

Tickets for Horror Movie 1 at Main Street Theater are booked for 5:30 PM showing. Would you like to confirm dinner reservations?
[ YES ]   [ NO ]

Dinner reservations are confirmed

320

Alice: Great, we are all set

Bob: See you on Friday

Chris: OK. I can't make the movie but I'll see you for dinner.

FIG. 3

405 — Alice: Hey, let's go to a movie and dinner this week

Bob: Sure

410 — Would you like to schedule activities?  YES  NO

415 — Please select date and times for the following activities:

Date: Friday ▼   From: 5:00 ▼  To: 10:00 ▼

420 — I have the following suggestion for you:

Movie: Horror Movie 1
Time: 5:30 PM-7:00 PM
Location: Main Street Theater

Dinner: Joe's Steakhouse
Time: 7:30PM reservation available
Location: 123 Main Street Is this acceptable?

YES  NO

FIG. 4

AUTOMATICALLY RESOLVING, WITH REDUCED USER INPUTS, A SET OF ACTIVITY INSTANCES FOR A GROUP OF USERS

BACKGROUND

A group of users can utilize an ongoing communication thread to determine a set of multiple activities in which the group will cooperatively participate. For example, a group of users may utilize respective mobile devices to exchange electronic messages (e.g., chat messages, emails, and/or text messages) in coordinating a night out that includes three activities: pre-dinner drinks, dinner, and a movie. Coordination of such activities requires a large quantity of electronic messages to be exchanged via the communication thread in order to resolve varying interests of users of the group, to resolve pre-existing time conflicts of the users, etc. Such message exchanges consume network resources (e.g., through transmission of the messages) and client device resources (e.g., through preparing a message to send and/or through rendering of a received message). Further, one or more users of the group will often utilize search engines, peruse webpages, and/or utilize other resources in determining a set of activities. Such utilization of resources in determining a set of activities can likewise consume network and/or client device resources.

As more users are included in a communication thread, the quantity of user inputs increases, as does the amount of client device and network resource usage. For example, a user may provide, in a communication thread that involves the user and additional users, a first message that is related to a group of activities (e.g., "let's do drinks, dinner, and movie on Friday?"). The first message can result in one or more of the additional users submitting search queries, utilizing apps, etc. in attempting to determine a set of locations for the activities of the group, time(s) for the activities of the group, etc. Additionally or alternatively, one or more of the users may prepare and send responses to the first user message, which will result in additional message(s) being transmitted and rendered. Further, such additional message(s) can result in further searches, further app utilization, etc. Collectively, such actions utilize significant network resources as well as significant resources of client devices of users involved in the message exchange thread (e.g., computing resources, battery resources).

SUMMARY

Implementations described herein automatically determine a set of activity instances that a group of users has interest in performing, and determines the set of activity instances with reduced (or no) input from the users of the group. For example, some implementations can automatically determine a limited quantity (e.g., only one, three or less, etc.) of sets of activity instances to be rendered for consideration by a group, and can do so even when only limited criteria (e.g., activity types, temporal constraint(s)) are provided through user interface input(s) of user(s) of the group. A representation of the limited quantity of sets of activity instances can be rendered in a communications session for consideration by the group. Optionally, in response to affirmative user interface input(s) directed to a rendered set of activity instances, one or more of the activity instances of the set can be confirmed through limited input(s) of one or more users of the group. Further, the automatic determination of set(s) of activity instances is optionally performed using one or more trained machine learning models that are trained to optimize a likelihood that the users of the group will find the limited quantity of set(s) satisfactory. Such automatic determination of a limited quantity of satisfactory sets results in a reduction in inputs of the users of the groups in coordinating a set of activity instances, thereby conserving client device and/or network resources. Additionally or alternatively, the reduction in inputs of the users can be beneficial to user(s) with limited dexterity.

In some implementations, a collection of two or more activity types are determined based on user interface input(s) from one or more users of a group of users. Further, one or more activity instances are then selected for each of the activity types. Yet further, a plurality of sets of activity instances are then generated, where each of the sets of activity instances includes a corresponding one of the activity instances for each of the activity types. Still further, a subset of the sets of the activity instances is selected and, in response to selecting the subset, representation(s) of the set(s) of the subsets are caused to be rendered to user(s) of the group of user(s). In some of those implementations, in response to receiving one or more affirmative user interface inputs directed to one of the rendered representations, client device(s) of user(s) of the group can be caused to render interface element(s) that, when selected, cause a respective one of the client devices to interact with a remote computer system in confirming one or more of the activity instances of the set of the one of the rendered representations. In various implementations, selecting the subset of the sets of the activity instances includes selecting one or more of the sets of the activity instances for inclusion in the subset based on respective generated feasibility scores. In some of those various implementations, the feasibility score for a given set of the activity instances is determined based on processing, using a trained machine learning model, respective features of the given set of the activity instances.

Additional description of these and other implementations is presented below. In such description, an "activity type" references a category of activities that has a plurality of activity instances as members of the category, where the activity instances all have one or more common characteristics. Activity types can be defined with various levels of granularity (e.g., the more general "movie" or the more particular "scary movie"). Non-limiting examples of activity types include "movie", "comedy movie", "scary movie", "dinner", "dinner at a gastropub", "lunch", "bike ride", "mountain bike ride", "hike", "difficult hike", "walking", "attend sporting event", "attend football game", "view sporting event", etc. Further, in such description, an "activity instance" references a single one of multiple members of an activity type. A given activity instance of an activity type has one or more characteristics that differentiates the activity instance from other activity instances of the activity type. Such characteristics can include, inter alia, name (or other identifier) characteristics, locational characteristics, temporal (e.g., time and/or date) characteristics, etc. As one example, an activity instance for "dinner" can be a particular restaurant such as "Hypothetical Café". As another example, activity instances for "dinner" can be defined more granularly, such as "Hypothetical Café" at 7:00 pm (temporal characteristic) or "Hypothetical Café" at 5:30 pm. As yet another example, activity instances for "movie" can be a particular movie such as "Hypothetical Movie", a particular movie at a particular movie theater (e.g., "Hypothetical Movie" at "Hypothetical Cinemas"), a particular movie at a particular movie theater and at a particular time (e.g., "Hypothetical Movie" at "Hypothetical Cinemas" at 7:00 pm).

In some implementations, a collection of activity types are determined based on one or more electronic messages of an ongoing multi-user communications session that involves a group of users (via their respective client devices). For example, activity types of "movie" and "dinner" can be determined based on natural language processing of one or more electronic messages of an ongoing message exchange thread that includes the group of users. For instance, activity types of "movie" and "dinner" can be determined based on an electronic message of "let's do dinner and a movie Wednesday night". In some implementations, a specific activity instance can additionally be determined based on message(s) of a communications session, along with one or more activity types. For example, the message "Let's go to Joe's Steakhouse, then go see a movie" can be processed to determine an activity instance of "Joe's Steakhouse" and an activity type of "movie". In other implementations, a collection of activity types can be determined based on other user interface inputs of user(s) of a group of users, such as user interface input(s) provided outside of any multi-user communications session (e.g., input(s) provide via a graphical interface dedicated to group activity planning).

Regardless of the manner in which the activity types (and optionally activity instance(s)) are determined, one or more activity instances can be selected for each of the activity types. For example, for activity types of "movie" and "dinner", multiple activity instances for "movie" can be selected, as well as multiple activity instances for "dinner".

In some implementations, selecting the activity instances can include selecting the activity instances based on one or more preference metrics of one or more of the users of the group. This can include filtering activity instances based on preference metrics (e.g., "hard" preference metrics) and/or by scoring activity instances based on preference metrics, and selecting the activity instances based on the scoring. For example, an initial group of "dinner" activity instances can be selected by filtering based on location, temporal constraints, and/or "hard" preference metrics of user(s) of the group. For instance, the initial group of "dinner" activity instances can be selected based on filtering so that only locations that are within 10 miles of all users of the group are selected, so that only locations that are open and/or have availability during a specified temporal period are selected (e.g., when particular date(s) and/or time(s) are specified), and/or so that only locations that offer gluten free options (based on a "hard" preference metric of a user) are selected.

Continuing with the example, a refined group of "dinner" activity instances can be selected from the initial group based on scoring the activity instances of the initial group based on preference metrics of the users of the group. For instance, a score can be generated for each activity instance based on the preference metrics of each user, and the scores for each activity instance (where each score is specific to a respective user) can be combined (e.g., averaged) to generate an overall score for each activity instance. Also, for instance, a score can be generated for each activity instance based on a combined preference metric that represents all users, and the score for each activity instance can be utilized as the overall score for each activity instance. The overall scores for the activity instances can then be utilized to select activity instance(s) for the "dinner" activity type.

Once activity instance(s) for each of the activity types are selected, a plurality of sets of activity instances are generated. Each of the sets includes one activity instance for each of the determined activity types. In various implementations, the sets of activity instances can be ordered sets of activity instances (i.e., ordered temporally). As one example, assume activity types of "movie," "dinner," and "museum" are determined from a communications session, and that multiple activity instances are determined for each activity type. Each of the sets of the activity instances can include one instance of each activity type. For instance, a first set can include "movie instance 1", "dinner instance 1", and "museum instance 1"; a second set can include "museum instance 1", "dinner instance 1", and "movie instance 1"; a third set can include "movie instance 2", "dinner instance 2", and "museum instance 2"; a fourth set can include "movie instance 1", "dinner instance 2", and "museum instance 1"; etc. In various implementations, a set of activity instances can be generated based on determining that temporal characteristics of the activity instances of the set don't overlap (e.g., a duration for a "movie" instance doesn't overlap with a start time for a "dinner" instance) and/or based on considering proximity of location characteristics for the activity instances of the set (e.g., ensuring activity instances are within 10 miles (or other distance threshold) of one another and/or within 20 minutes (or other travel threshold) travel time of one another).

The sets of activity instances can then be scored and, based on the scores, a subset of the sets of activity instances selected as final activity set(s). In various implementations, each of the sets of activity instances is scored based on processing features of the set of activity instances using a trained machine learning model. For example, features of each of the sets can be processed utilizing the machine learning model to generate a respective feasibility score for each of the sets. Each feasibility score indicates a likelihood that the respective set of activity instances will be performed by the group and/or considered satisfactory by the group. Based on the feasibility scores, one or more of the sets are selected as a final activity set(s).

Various features of the activity instances of the set can be processed using the machine learning model. Some non-limiting examples of features of an activity instance that can be processed include: feature(s) that defines activity type(s) for the activity instance; feature(s) that defines score(s) for the activity instance (e.g., the score described above that is based on preference metrics of all users of the group); location feature(s) that define feature(s) of a geographic location for the activity instance (e.g., distance and/or travel time relative to other activity instance(s) of the set, distance and/or travel time relative to home or other location(s) of the users of the group); temporal feature(s) that defines one or more times for the activity instance (e.g., absolute time, time difference relative to a start of a following activity instance of the set, time difference relative to an end of a preceding activity instance of the set); global quality feature(s) that defines reviews, popularity, and/or other global quality metrics for the activity instance among a plurality of users (including users that are in addition to those of the group); features that define hard constraints/necessary conditions for one or more users to participate in an activity (e.g., restaurants with gluten-free options, wheelchair accessible locations); etc.

In various implementations, the machine learning model used in generating a feasibility score for a set of activity instances is a neural network model. In some versions of those implementations, the neural network model is a feed forward neural network model and the features for all of the activity instances of a set being considered are processed as simultaneous input to the model (e.g., the input dimensions of the model are configured to accept features for all activity instances of the set). For example, the input dimensions of the model can be configured to accept features for up to N activity instances of a set. Where a given set being scored using the model has less than N activity instances, padding values can be utilized for features for unconsidered activity instances. In some other versions of those implementations, the neural network model is a recurrent neural network (RNN) model, and the features for the activity instances of a set are processed on an activity instance by activity instance basis. For example, the features of the first activity instance of an ordered set can be processed using the model, followed by the features of the second activity instance of the ordered set, etc. The generated output from the processing of the final activity instance of the set can then be used as the feasibility score.

In various implementations, the machine learning model used in generating a feasibility score is trained based on supervised and/or semi-supervised training examples. Each of the training examples can include, as training example input, features of a respective set of activity instances and can include, as training example output, a labeled feasibility score that indicates a labeled likelihood that the respective set of activity instances will be performed by the group and/or considered satisfactory by the group. Some labels for some training example outputs can be generated based on one or more human reviewers reviewing the set of activity instances for the corresponding training example input, and assigning a label. Some labels for some training example outputs can additionally or alternatively be generated based on actual behavior and/or feedback of user(s) of a respective group that accepted a recommendation for a set of activity instances for the corresponding training example input. For example, a given training example output for a given training example can be based on whether user(s), who received a recommendation for a set of activity instances corresponding to the training example input of the given training example, actually engaged in the activity instances of the set. For instance, a relatively "negative" training example output label such as "0" or "0.1" can be assigned if none of the users engaged in the activity instances, whereas a relatively "positive" training example output label such as "1" or "0.9" can be assigned if one or more (e.g., all) of the users engaged in the activity instances. Such a determination can be made based on responses of the user(s) to solicited feedback and/or based on consideration of location signals and/or other signals from client devices of the respective users, with appropriate permission from the respective users. As another example, a given training example output for a given training example can be based on feedback provided by user(s) (e.g., in response to a prompt rendered to the user(s) via respective client device(s)) who received a recommendation for a set of activity instances corresponding to the training example input of the given training example. For instance, a prompt of "did the group enjoy the set of activities?" can be rendered to one of the users following completion of the activities, along with selectable options of "no", "enjoyed somewhat", "mostly enjoyed", and "loved it". A training example output label such as "0" can be assigned if "no" is selected, a label such as "0.3" can be assigned if "enjoyed somewhat" is selected, a label such as "0.6" can be assigned if "mostly enjoyed" is selected, and a label such as "1" can be assigned if "loved it" is selected.

As mentioned above, one or more final sets of activity instances are selected based on the respective feasibility scores. The final sets can be a subset of the considered sets of the activity instances. In response to selecting the subset, representation(s) of the final set(s) are caused to be rendered to user(s) of the group of user(s). For example, the representation(s) can be rendered in an ongoing multi-user communications session that involves the users. For instance, the representation(s) can be rendered as selectable elements to one or more of the users and, if selected by one or more of the users via affirmative user interface input, incorporated in a transcript of the multi-user communications session. In some of those implementations, in response to receiving one or more affirmative user interface inputs directed to one of the rendered representations, client device(s) of user(s) of the group can be caused to render interface element(s) that, when selected, cause a respective one of the client devices to interact with a remote computer system in confirming one or more of the activity instances of the set of the one of the rendered representations. For example, in response to receiving one or more affirmative user interface inputs directed to one of the rendered representations, client device(s) of user(s) of the group can be caused to render interface element(s) that, when selected, cause a respective one of the client devices to interact with a remote computer system in obtaining an electronic movie ticket for a "movie" activity instance. The respective one of the client devices can interact with the remote computer system in a manner that is tailored to the client device. For example, a given client device can use address information, payment information, and/or other information of a user of the given client device in obtaining the electronic movie ticket.

The above is provided as an overview of some implementations disclosed herein. Further description of these and other implementations is provided below.

In some implementations, a method performed by one or more processors is provided that includes determining a collection of activity types based on user interface input of one or more users of a group of users. The collection of activity types includes at least a first activity type and a second activity type. The method further includes selecting one or more activity instances for each of the activity types of the collection. Selecting the one or more activity instances for each of the activity types of the collection is based on preference metrics for each of the users, and the activity instances include multiple activity instances for the first activity type and multiple activity instances for the second activity type. The method further includes generating a plurality of sets of the activity instances, where each of the sets of the activity instances includes a corresponding one of the activity instances for each of the activity types. The method further includes, for each set of the activity instances, of the sets of the activity instances: processing, using a trained machine learning model, respective features of the set of the activity instances to generate a respective feasibility score for the set of the activity instances. The method further includes selecting a subset of the sets of the activity instances based on the feasibility scores, where the subset including at least a given set of the activity instances. The method further includes causing, in response to the selecting, at least one client device of at least one of the users to render a representation of the given set of the activity instances.

These and other implementations of the technology can optionally include one or more of the following features.

In some implementations, the user interface input is provided as part of an ongoing communications session between the group of users. In some of those implementations, causing the at least one client device to render the representation of the given set of the activity instances occurs without rendering the representation in a transcript in the ongoing communications session. In some versions of those implementations, the method further includes: receiving affirmative user interface input responsive to the representation being rendered; and in response to receiving affirmative user interface input responsive to the representation being rendered: incorporating the representation, or an additional representation of the given set of the activity instances, into the transcript of the ongoing communications session.

In some implementations, the respective features for the activity instance of at least one of the activity types that is processed using the trained machine learning model include: a location feature that defines a geographic location for the activity instance, and a temporal feature that defines one or more times for the activity instance.

In some implementations, the method further includes identifying a location metric for at least one of the users, and processing, using the trained machine learning model, the location metric along with the respective features of each of the ordered sets of the activity instances in generating the feasibility scores.

In some implementations, the method further includes determining a supervised feasibility score for the given set of the activity instances and further training the machine learning model using a training example that includes training example input that conforms to the respective features for the given ordered set and that includes training example output that conforms to the supervised feasibility score. In some of those implementations, determining the supervised feasibility is based on one or both of: (1) whether at least one of the users performed the given set of the activity instances, and (2) feedback provided by at least one of the users in response to rendering of a prompt that solicits feedback regarding the given set of the activity instances.

In some implementations, a method implemented by one or more processors is provided that includes determining that one or more messages of an ongoing multi-user communications session reference a collection of activity types. The determining is based on processing of content of the one or more messages of the ongoing multi-user communications session, a plurality of users is participating in the multi-user communications session via respective client devices, and the collection of activity types includes at least a first activity type and a second activity type. The method further includes selecting one or more activity instances for each of the activity types of the collection. Selecting the one or more activity instances for each of the activity types of the collection is based on preference metrics for each of the users, and the activity instances include multiple activity instances for the first activity type and multiple activity instances for the second activity type. The method further includes generating a plurality of ordered sets of the activity instances, where each of the ordered sets of the activity instances includes a corresponding one of the activity instances for each of the activity types. The method further includes, for each ordered set of the activity instances, of the ordered sets of the activity instances: processing, using a trained machine learning model, respective features of the ordered set of the activity instances to generate a respective feasibility score for the ordered set of the ordered activity instances. The method further includes selecting a subset of the ordered sets of the activity instances based on the feasibility scores, where the subset includes at least a given ordered set of the activity instances. The method further includes causing, in response to the selecting, a representation of the given ordered set of the activity instances to be rendered at the client devices as part of the multi-user communications session. The method further includes, in response to receiving at least one instance of affirmative user interface input responsive to the representation being rendered: causing each one of the client devices to render a respective interface element that, when selected, causes a respective one of the client devices to interact with at least one remote computer system in confirming at least one of the activity instances of the given ordered set of the activity instances. The respective one of the client devices interacts with the remote computer system in a manner that is tailored to the respective one of the client devices to confirm the at least one activity instance for the respective user of the one of the client devices.

These and other implementations of technology disclosed herein may optionally include one or more of the following features.

In some implementations, the respective features for the activity instance of at least one of the activity types that is processed using the trained machine learning model includes: a location feature that defines a geographic location for the activity instance; and/or a temporal feature that defines one or more times for the activity instance.

In some implementations, the method further includes identifying a location metric for at least one of the users and processing, using the trained machine learning model, the location metric along with the respective features of each of the ordered sets of the activity instances in generating the feasibility scores. In some of those implementations, each of the activity instances defines a respective activity and respective temporal information for the respective activity, and selecting one or more activity instances for each of the activity types includes: identifying a temporal constraint of one of the users; and excluding a conflicting activity instance from the selected activity instances based on the temporal constraint matching the respective temporal information of the conflicting activity instance.

In some implementations, the respective interface element that is caused to be rendered by one of the client devices, when selected, causes the one of the client devices to launch, with parameters for the at least one of the activity instances, an application installed on the one of the client devices. The application, when launched, interfaces with the at least one remote computer system, using the parameters, in confirming the at least one of the activity instances of the given ordered set of the activity instances.

In some implementations, the method further includes determining a supervised feasibility score for the given ordered set of the activity instances and further training the machine learning model using a training example that includes training example input that conforms to the respective features for the given ordered set and that includes training example output that conforms to the supervised feasibility score. In some of those implementations, determining the supervised feasibility is based on one or both of: (1) whether at least one of the users performed the given ordered set of the activity instances, and (2) feedback provided by at least one of the users in response to rendering of a prompt that solicits feedback regarding the given ordered set of the activity instances. In some versions of those implementations, determining the supervised feasibility score is based on whether at least one of the users performed the given ordered set of the activity instances, and the method further includes determining whether at least one of the users performed the given ordered set of the activity instances based on location information for at least one of the users.

In some implementations, the method further includes: identifying an indication of a specified activity in the communication thread; and determining an additional activity type for the specified activity, wherein selecting one or more activity instances for each of the activity types of the collection includes selecting one or more activity instances for the additional activity type. In some of those implementations, the activity instances includes the specified activity.

In some implementations, selecting the one or more activity instances for each of the activity types of the collection includes: generating a plurality of first candidate activity instances based on a first activity type of the activity types of the collection; processing, using a second machine learning model, one or more of the respective features of each of the candidate activity instances and the preference metrics of the users to generate a respective approval score for each of the candidate activity instances, where the respective approval score of a given candidate activity instance is indicative of overall approval of the given candidate activity instance by the plurality of users based on the preference metrics of the users; and selecting one or more of the candidate activity instances based on the respective approval scores.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example graphical user interface of an ongoing multi-user communication session that can provided to a client device of a user according to implementations described herein.

FIG. 4 illustrates another example graphical user interface of an ongoing messaging stream and activity instance suggestion set that can be provided to a client device of a user according to implementations described herein.

DETAILED DESCRIPTION

Figure 1:
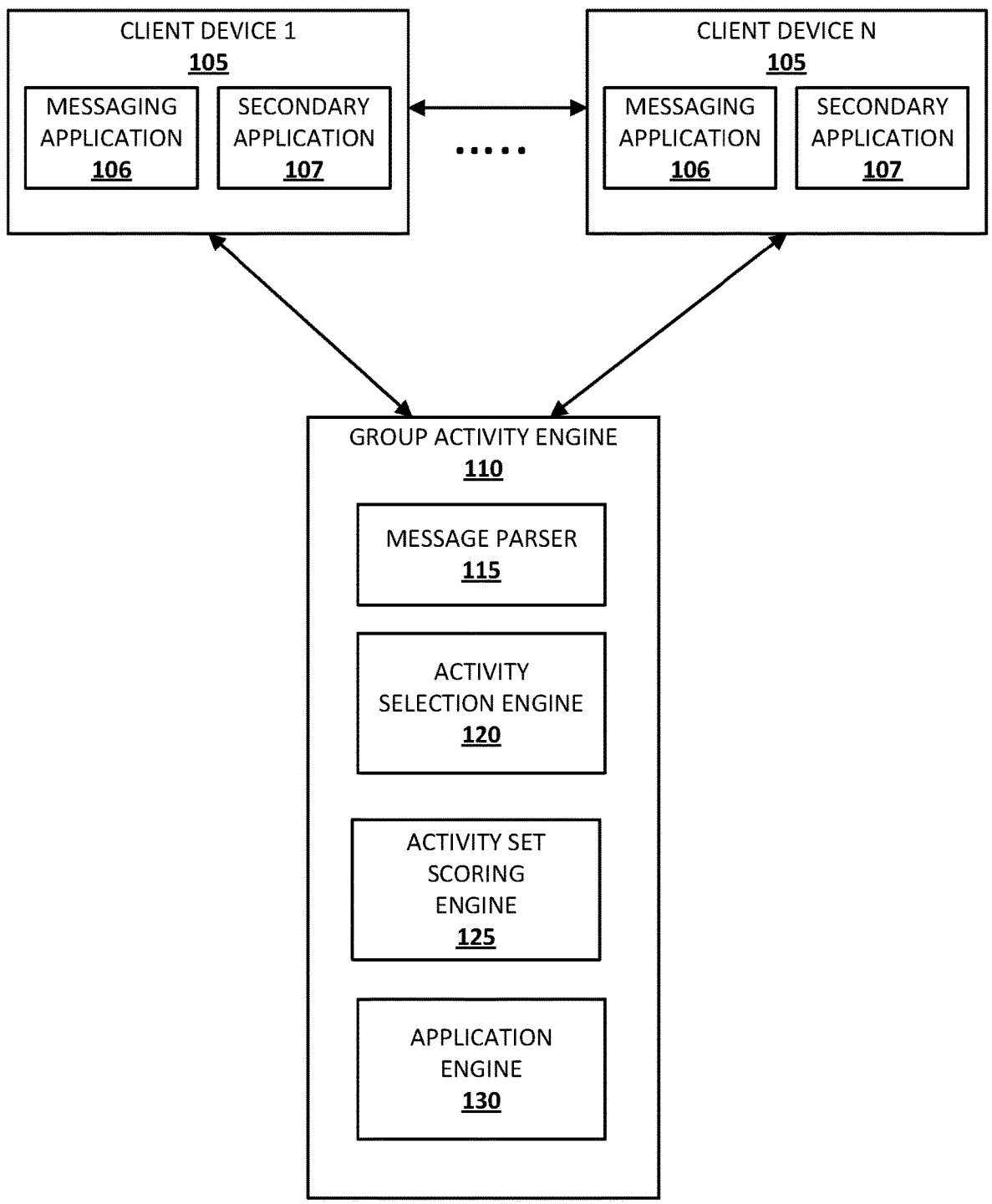
FIG. 1 is a block diagram of an example environment in which implementations disclosed herein can be implemented.

Referring to FIG. 1, a block diagram is illustrated of an example environment in which implementations disclosed herein can be implemented. The example environment includes a plurality of client devices 105 and a group activity engine 110. The client devices 105 may include, for example, one or more of a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

The client devices 105 and the group activity engine 110 can communicate via one or more networks, such as the Internet, local area networks, wide area networks, and/or one or more other communication networks. In some implementations, client devices 105 and/or group activity engine 110 may communicate via one or more additional components. For example, one of the client devices 105 may communicate with a second client device 105 via a remote server which facilitates communication between one or more components of a first and second client devices 105.

The client devices 105 can each include a corresponding messaging application 106. The messaging applications 106 allow users to participate in an ongoing multi-user communications session. The communications session may be, for example, a multi-user text message (e.g., SMS) communications session, a multi-user chat communications session, a multi-user email exchange communications session, and/or one or more alternative communications sessions that allow multiple users to provide textual and/or other input that is receivable by the other members of the session in real-time or near real-time. For example, referring to FIG. 3, an example graphical user interface (GUI) of an ongoing multi-user communication session is illustrated. Dialog box 305 includes messages from three users, labelled as "Alice", "Bob", and "Chris". As "Alice" submits a first message via messaging application 106, users "Bob" and "Chris" receive the message via a messaging application 106 executing on a respective client device 105 of each of the other users. Subsequently, one or more of the other users (i.e., users "Bob" and "Chris") may reply to the first message, which is subsequently provided via messaging application 106 to each of the users. Thus, the ongoing multi-user communication session allows the users of a group to communicate within the group.

Referring again to FIG. 1, in some implementations, group activity 110 may be a component of, or otherwise interface with, messaging application 106. For example, as users participate in a communications session via messaging application 106, the messages of the session may be provided to one or more components of group activity engine 110. In some implementations, group activity engine 110 may be executing on a remote server and messaging application 106 can provide messages of a communications session to one or more components of group activity engine 110 via a communication network, as described.

Message parser 115 parses messages of a communication session to identify reference(s) to activity type(s) and to optionally identify temporal information that is included in one or more messages and associated with the activity types. An activity type is a reference to a general category of activities in which users may have interest in participating. A temporal reference can include, for example, a day of the week (e.g., Monday, Tuesday, etc.), a specific date (e.g., 9/1/18), a time window (e.g., 18:00-20:00), a specific time (e.g., 18:30), a relative time that is relative to another event (e.g., after the gym, after work), etc. that identifies a temporal constraint for one or more activity types. For example, referring again to FIG. 3, user "Alice" submits the message "Let's go to a movie on Friday." The message includes a reference to "movie," which describes a type of activity. Further, the message includes a reference to "Friday," which describes a time that the user has interest in performing the activity. Based on the context of the message (e.g., "Let's go to a movie"), message parser 115 may determine that at least one of the users has interest in attending a movie (a movie activity type) with the other users of the communication session. Further, the message parser 115 can determine a temporal constraint of "this Friday" for the movie activity type based on context of the message (e.g., resolving "on Friday" to "this Friday"). Also, for example, user "Chris" provides a message that indicates an interest in having dinner, which is confirmed by user "Alice". Based on the reference and the context of the reference, message parser 115 may identify "dinner" as an activity type that a plurality of the users has interest in performing. Further, the message parser 115 can also determine a temporal constraint of "this Friday" for the dinner activity type.

Message parser 115 may further include a natural language processor that can process free-form natural language input and generate, based on the natural language input, annotated output. For example, the natural language processor can process natural language free-form input that is provided by one or more users in a conversation thread. The generated annotated output may include one or more annotations of the natural language input and optionally one or more (e.g., all) of the terms of the natural language input.

In some implementations, the natural language processor can be configured to identify and annotate various types of grammatical information in natural language input. For example, the natural language processor of message parser 115 may include a part of speech tagger (not depicted) configured to annotate terms with their grammatical roles. Also, for example, in some implementations the natural language processor may additionally and/or alternatively include a dependency parser (not depicted) configured to determine syntactic relationships between terms in natural language input.

In some implementations, message parser 115 may additionally and/or alternatively include an entity tagger (not depicted) configured to annotate entity references in one or more segments such as references to people (including, for instance, literary characters, celebrities, public figures, etc.), organizations, locations (real and imaginary), activities and/or activity types, and so forth. The entity tagger may annotate references to an entity at a high level of granularity (e.g., to enable identification of all references to an entity class such as an activity type) and/or a lower level of granularity (e.g., to enable identification of all references to a particular entity such as a particular restaurant). The entity tagger may rely on content of the natural language input to resolve a particular entity and/or may optionally communicate with a knowledge graph or other entity database to resolve a particular entity.

In some implementations, message parser 115 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." Referring to FIG. 2, an example is provided that illustrates generating ordered sets of activity instances from a communication session 205. The communication session 205 may share one or more characteristics with the messages illustrated in dialog box 305 of FIG. 3. The communication session is provided to the message parser 115. In some implementations, the communication session 205 may be provided to the message parser 115 periodically, such as once a requisite number of messages have been submitted to the communication session. For example, users may submit messages to the communication session and the messages may be provided to the message parser 115 once three messages have been submitted to the session. Also, for example, a message may be provided to message parser 115 as it is submitted to the communication session.

Message parser 115 determines activity types based on the messages of the communication session 305. Referring again to FIG. 3, message types of "Dinner" 210 and "Movie" 215 are identified from a message communication, such as the communication dialog 305 of FIG. 3. The identified activity types are provided to activity selection engine 120 of group activity engine 110. Activity selection engine 120 selects, for each of the provided activity types, one or more activity instances for each of the activity types. For example, referring again to FIG. 3, activity selection engine 120 selects a set of dinner activities 220 based on the dinner activity type 210 and a set of movie activity instances 225 based on the movie activity type 215. In some implementations, the activity instances may be selected based on temporal information as described herein (e.g., selecting movie activity instances 225 based on movies that are playing on a date and/or in a temporal window that are indicated in message(s) as temporal constraints) and/or one or more preference metrics of the users. For example, user preferences may be identified from one or more databases of user preferences and the preferences may be utilized to identify candidate activity preferences for a respective activity type. Referring again to FIG. 2, dinner activity instances are selected for the user group of the communication session 205. As illustrated, the dinner activity instances of "Joe's Steakhouse," "El Burrito," and "Texas BBQ" have been selected by activity selection engine 120. The activity instances may be selected based on, for example, the type of food of each of the activity instances and one or more user preferences for the cuisine type of each of the activity types. For example, user preferences of the users of the session may indicate that the users have an interest in dining at a steakhouse (i.e., Joe's Steakhouse), dining at a Mexican restaurant (i.e., El Burrito), and/or dining at a barbecue restaurant (i.e., Texas BBQ). User preferences may be identified based on, for example, previous visits to locations by one or more of the users, searches submitted by one or more of the users, and/or one or more other indications of preferences of the users.

As an example, each of the users of the group may be associated with a set of preference metrics unique to that user. Each of the preference metrics can be indicative of interest of the user in one or more features of an activity instance. For example, for an activity type of "dinner," various activity instances may be identified that are each associated with a cuisine type (e.g., Italian, Mexican, Steakhouse). In some implementations, the preference metrics of one or more users may include a metric indicating a level of interest in particular cuisine. For example, a user may be associated with preference metrics indicating a ranking of a number of types of cuisine and/or a rating for each of a plurality of cuisines. In some implementations, a user may be associated with a subset of cuisines that are "liked" and a set of cuisines that are "disliked." For example, a user may be associated with a subset of cuisines that includes "Italian" and "Seafood" for liked cuisines and a subset of cuisines that includes "Barbecue" for disliked cuisines.

In some implementations, message parser 115 can identify a message from one or more of the users, where the message indicates an interest to perform one or more activities, but does not specify a particular activity. For example, message parser 115 can identify a message from a user that includes "Let's do something on Friday", without an indication of a particular activity to perform. Based on the message, message parser 115 can determine that the group has interest in performing one or more activities (e.g., based on "Let's do something") and can optionally determine a date for the one or more activities (e.g., based on "Friday"). Further, the message parser 115 can cause a prompt to be rendered to one or more of the users (e.g., the user that indicated "Let's do something on Friday") to solicit further information regarding activities that the group may have interest in performing. For example, message parser 115 may provide an interface to allow a user to select one or more activity types, one or more activities, and/or to otherwise allow the user to provide additional details regarding the one or more activities of interest. In some implementations, message parser 115 can additionally or alternatively proactively provide recommendations for one or more activities, such as recommendations for activities that are selected based on preference metric(s) of user(s) of the group. For example, message parser 115 can provide recommendation(s) for popular event(s) that are geographically proximate to the user(s) of the group and that match one or more preference metric(s) of user(s) of the group. The recommendations can be provided, for example, as selectable recommendations to be rendered as part of the previously mentioned interface. For example, in response to "Let's do something on Friday", message parser 115 can provide an interface with one or more selectable recommendations that, when selected, adds the recommendation(s) as fixed activity instance(s). The interface can optionally include elements to enable the user to provide additional details regarding other activity instances and/or activity type(s).

Again, referring to FIG. 2, a plurality of movie activity instances 225 for movies is selected for the group of users. The movie activity instances of activity instances 225 may be identified based on, for example, identifying previous movies attended by the users, tickets purchased by the users from one or more applications executing on client devices 105, identifying a user being present at a movie theater location that coincides with a movie duration at the location, and/or one or more other indications of the user presence at a particular genre of movie.

In some implementations, activity selection engine 120 may generate a plurality of candidate activity instances for each activity type and provide each of the candidate activity instances to a machine learning model to determine an approval score for each of the activity instances. For example, the machine learning model may receive, as input, the preference metrics of each of the users of the group as well as a plurality of generated activity instances, each of which is associated with one or more features (e.g., location, genre, cuisine, subject matter). Activity selection engine 120 processes, using the machine learning model, each of the activity instances of the candidate set to determine, based on the preference metrics, an approval score that is indicative of overall approval of the given activity instance by the users of the group. Based on the approval scores, activity selection engine 120 selects one or more of the candidate activity instances to order into ordered sets of activity instances.

For example, referring again to FIG. 2, activity selection engine 120 can select candidate dinner activity instances 220. As illustrated, three activity instances are selected: Joe's Steakhouse, which may be associated with a "steakhouse cuisine" feature; El Burrito, which may be associated with a "Mexican cuisine" feature; and Texas BBQ which may be associated with a "Barbecue cuisine" feature. Each of the users of the group can be associated with preference metrics and one or more of the metrics may indicate, for one or more of the users, that user's interest and/or preference to one or more cuisines. Activity selection engine 120 may process the preference metrics and the candidate activity instances to generate approval scores for each of the activity instances, and select a subset for each activity type. Thus, although all dinner activity instances 220 are utilized to generate ordered sets of activity instances in FIG. 2, activity selection engine 120 may select additional candidate activity instances, score the additional instances, and select only the three illustrated in FIG. 2.

In some implementations, a score can be generated for each activity instance based on the preference metrics of each user, and the scores for each activity instance (where each score is specific to a respective user) can be combined (e.g., averaged) to generate an overall score for each activity instance. Also, for instance, a score can be generated for each activity instance based on a combined preference metric that represents all users (e.g., based on combining preference metrics of all users), and the score for each activity instance can be utilized as the overall score for each activity instance. The overall scores for the activity instances can then be utilized to select activity instance(s) e.g., for the "dinner" activity type.

In some implementations, a generated score for each activity instance can additionally or alternatively be based on metrics identified from one or more other sources. For example, a score for an activity instance can be based at least in part on one or more of: ratings of the activity instance provided by another group of users (e.g., star, numeric, and/or other ratings provided as feedback by a population of users, including users that are in addition to those of the group of the activity planning), a frequency of mentions of the activity instance in recent media, location-data based metrics that indicate how popular the activity instance is among a population of users, and/or other indications of the popularity of a particular activity instance.

In some implementations, a generated score for an activity instance can additionally or alternatively be based on identifying one or more other users that are associated with user(s) of the group and determining that one or more of the other users have performed the activity. For example, "Bob," who is a member of the message thread, may be associated with "Dave" (a user who is not part of the message thread), either through the same application as the message thread application or through an alternative application. A score for an activity instance may be based on identifying that "Dave" has performed the activity via a posting on social media, a photo that is tagged with the activity instance location, and/or other indications that "Dave" has performed the activity instance. Optionally, the score can be based on "Dave" having performed the activity and "Bob" having indicated interest in "Dave's" performance of the activity (e.g., through viewing of the posting and/or photo, an affirmative like of the posting and/or photo, etc.).

Once activity instances are selected for each of the activity types, sets of activity instances are generated. In some implementations, the sets may be sequentially ordered such that, for a given set, the first activity instance of the set is to be performed by the group first, followed by each subsequent activity instance. In some implementations, the sets of activity instances may not be ordered and the activity instances can be performed in any order. Each of the sets includes one activity instance for each of the activity types identified by activity selection engine 120. For example, activity selection 120 may identify a dinner activity type and a movie activity type. The activity engine 120 can select one or more dinner activity instances 220 and one or more movie activity instances 225, as illustrated in FIG. 2.

Figure 2:
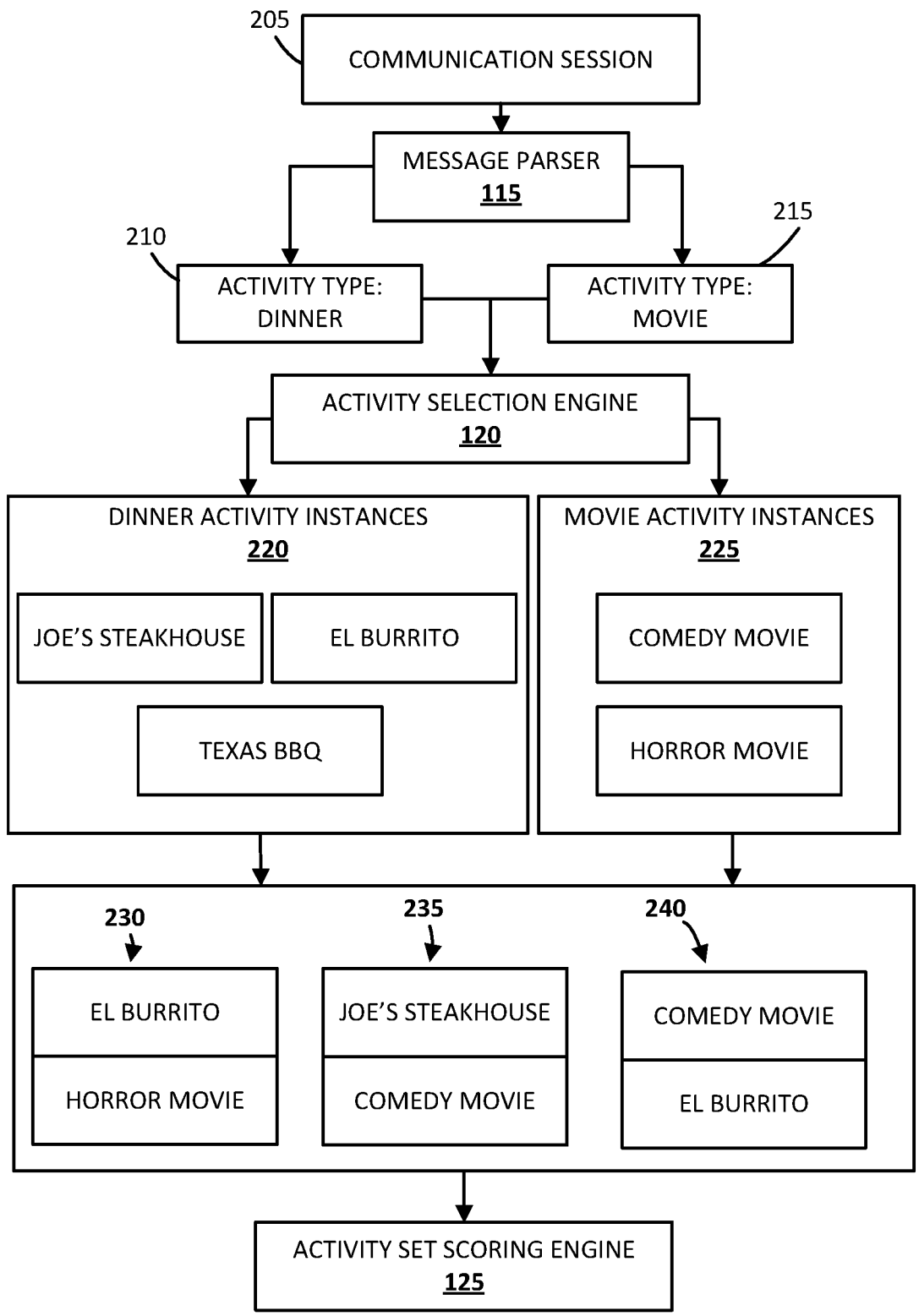
FIG. 2 illustrates an example of generating sets of activity instances.

As illustrated in FIG. 2, sets of activity instances are generated. The generated ordered sets include an activity instance for each of the activity types that are identified by the activity selection engine 120. In some implementations, a first ordered set may include activity instances in a different order than a second ordered set. For example, one or more of the of the sets of activity instances may include a movie activity type followed by a dinner type and one or more of the ordered activity instances may include a dinner activity type followed by a movie activity type.

As illustrated in FIG. 2, three ordered sets of activity instances are illustrated. Set 230 and set 235 includes a dinner activity instance followed by a movie activity instance. Set 240 includes a movie instance followed by a dinner instance. Each of the ordered sets includes a movie instance and a dinner instance and are provided to activity scoring engine 125.

Activity scoring engine 125 processes the sets of activity instances using a machine learning model that receives activity instances as input, as previously described. Using the machine learning model, each of the ordered sets is processed and a feasibility score is determined for each of the ordered sets. Based on the feasibility scores of each of the set, one or more of the sets is selected as a subset of the sets of activity instances. For example, referring again to FIG. 2, three ordered sets of activity instances are provided to the activity scoring engine 125. The activity scoring engine 125 can score each of the ordered sets 230, 235, 240 and select one or more of the ordered sets based on the generated feasibility scores.

In some implementations, one or more features of the activity instances of a set may be utilized to generate a feasibility score for the set. For example, one or more activity instances may include one or more location features that are indicative of the location of the activity. Location information may include a street address, GPS location, a path for an activity that can include a starting location and an ending location for non-localized activities (e.g., a bike ride activity). In some implementations, one or more activity instances may be associated with one or more times for the activity instance. For example, dinner activity instances may be associated with a reservation time, movie activity instances may be associated with a movie starting and ending time, a bike ride activity instance may be associated with an approximate completion time, and/or a museum activity instance may be associated with a museum opening and closing time or the expected duration of the visit. Thus, distances between locations and/or differences in times between activity instances may be provided to the machine learning model as input and utilized to generate a feasibility score for the set.

In some implementations, one or more of the users may be associated with a location metric that may be provided as input when processing an ordered set to determine a feasibility score. For example, each user may be associated with a "home" location and feasibility scores for one or more sets of activity instances may be generated based on distance of users from one or more of the activity instances. As an example, an ordered set that starts with an activity instance with a location feature that indicates a lengthy drive for one of the users may have a generated feasibility score that is less indicative of interest to the group than an ordered set that includes activity instances that are distanced closer to all users.

In some implementations, one or more of the users may be associated with one or more temporal constraints that may prevent a given user from participating in one or more activity instances of a set. For example, a user may have a calendar entry that indicates a prior engagement from 4:00 pm to 5:00 pm. Activity selection engine 120 may exclude any activities with a time feature that conflicts with the time period that the user is unavailable. Also, for example, one or more users may indicate, in the course of the communication thread, one or more times that the user is unavailable activity selection 120 may exclude any activity instances that conflict with that time.

Once one or more of the sets are selected as a subset to provide to the users, a representation of the set of activity instances is provided to the client devices of the users to be rendered by an application, such as secondary application 107 of FIG. 1. Each of the activity instances of a set is associated with one or more of the ordered sets identified by the activity selection engine 120. In some implementations, each of the activity instances of a set is associated with one of the activity types of the activity types selected by the activity selection engine 120. For example, the ordered set of activity instances 230 includes an activity instance of activity type "dinner" (i.e., "El Burrito") and a selected activity type of "Movie" (i.e., "Horror Movie"). In some implementations, one or more of the activity instances of a set may be associated with multiple activity types. For example, an ordered set may include an activity instance of "Museum 1," which is of activity type "Museum" but additionally has an exhibit on bicycles. Thus, an activity instance of "Museum 1" may be selected as an activity instance of an ordered set that is both a "Museum" activity type and a "Biking" activity type.

In some implementations, one or more of the ordered sets are rendered as part of the multi-user communications session. For example, the messaging application 106 can render the representation of a given ordered set of activity instances. Referring again to FIG. 3, a representation 310 of an ordered set of activity instances is illustrated. The representation 310 includes two activity instances: a movie (Horror Movie 1) and dinner (Joe's Steakhouse). Further, the representation 310 includes features of the activity instances. For example, for the movie activity instance, the representation 310 includes a time for the movie and a theater location. In some implementations, additional and/or alternative features may be provided for activity types, such as a subject matter, a physical address, a special event related to an activity instance (e.g., a special exhibit at a museum), and/or any other additional features that may assist a user in deciding whether to perform the activity instance or to reject the ordered set of activity instances.

Additionally, the representation 310 includes selectors to allow a user to indicate an interest in performing additional actions. As illustrated, representation 310 includes a prompt asking the user if tickets should be purchased for the movie activity instance. If the user indicates an interest in purchasing tickets, application engine 130 interacts with one or more remote computer systems in a manner that is tailored to the user's client device to confirm purchasing tickets to the movie indicated by the movie activity instance of representation 310. For example, application engine 130 may interact with a remote computer that is associated with a movie theater tickets sales entity and purchase tickets specifically for "Alice" when she indicates an interest to purchase tickets on the client device of "Alice," and application engine 130 can interact with the same remote computer when "Bob" indicates an interest to purchase tickets but tailored to "Bob" (e.g., using "Bob's" payment information, reserving the tickets in "Bob's" name, purchasing a specific number of tickets based on "Bob's" preferences). In some implementations, application engine 130 may be absent and the client devices may directly interact with the remote computer.

In some implementations, after a representation of one or more activity sets is provided to the group of users, the activity set(s) may be updated based on feedback provided by one or more of the users via additional messages and/or other user interface inputs. For example, a set of activity instances can be provided that includes a particular movie, dinner at an Italian restaurant, and a visit to a museum, as described herein. The set of activity instances can be provided via an interface as illustrated in FIG. 3, and after the set of activity instances is provided, a user may submit a message of "I'd like to see that movie, but I don't want Italian food." Based on the user feedback, activity selection engine 120 may determine additional and/or alternate activity sets that do not include a dinner activity instance with a cuisine type of "Italian." For instance, the activity selection engine 120 can keep the visit to the museum and the particular movie fixed, but propose an alternative restaurant (i.e., one that does not have a cuisine type of "Italian"). As another example, after the set of activity instances is provided via an interface, a user can interact with the interface to remove one or more activity instance(s) of the set, to cause alternative(s) for one or more of the activity instance(s) of the set to be presented, etc. For instance, a user can select one of the activity instances of the set to view alternatives for the selected one of the activity instances.

In some implementations, a supervised feasibility score may be determined for one or more of the activity instances that are provided to the group of users, as described above. The supervised feasibility score of a provided ordered set is indicative of the actual feasibility of the ordered set based on feedback from one or more of the users. In some implementations, the supervised feasibility score can be based on whether at least one of the users performed the ordered set of activity instances. For example, the client device of one or more of the users may provide location information for the user and one or more components of the group activity engine 110 may identify that the user was not present in the vicinity of an activity instance of the ordered set during a time associated with the activity instance (e.g., not near the movie theater during the Showtime of a movie activity instance of an ordered set). In some implementations, one or more users may indicate in the communication thread that the user is unable or uninterested in performing one or more of the activity instances of an ordered set. For example, referring again to FIG. 3, in communication block 320, "Chris" indicates that he is unable to attend the movie activity instance of the provided ordered set. Thus, a supervised feasibility score may be determined for the provided ordered set that indicates that the provided ordered set did not completely satisfy the group. In some implementations, one or more of the users may be prompted, either via the messaging application 106 or another application, to rate or otherwise characterize the suitability of the provided ordered set of activity instances. The responses of one or more of the users may be utilized to determine a supervised feasibility score for the provided ordered set.

Once a supervised feasibility score is determined for a provided ordered set, the activity instances of the set and the supervised feasibility score may be utilized to further train the machine learning model. For example, an ordered set may have initially had a feasibility score of 0.9, as determined by the activity set scoring engine 125. However, based on feedback from one or more of the users, a supervised feasibility score of 0.6 is determined (e.g., one or more users did not attend an activity instance, one or more users indicated that the ordered set was not acceptable). The supervised feasibility score and the ordered set may then be utilized to further train the machine learning model such that, for subsequent ordered sets, the resulting selected ordered sets may be more likely to be accepted by one or more groups.

FIG. 4 illustrates another example graphical user interface of an ongoing messaging stream and activity instance suggestion set that can be provided to a client device of a user according to methods described herein. The graphical interface includes a dialog block 405 that can share one or more characteristics with dialog block 305 of FIG. 3. In dialog block 405, "Alice" suggests attending a movie and having dinner, but does not specify a date and/or time for the activities. Based on message parser identifying that activities have been suggested, prompt 410 is provided to one or more of the users to allow a user to indicate an interest in being provided a set of activity instances. Further, message parser 115 can identify that activities have been referenced in the conversation thread but that additional details of the activities may be necessary to provide the group with an activity instance set. Thus, once one of the users indicates an interest in being provided a set of activity instances, a temporal input box 415 is provided to one or more of the users to provide additional information regarding the time that the users have interest in performing the referenced activities. In some implementations, input box 415 may include additional and/or alternative fields to allow users to provide additional information, such fields to indicate a location. Once the additional information is provided, one or more ordered sets of activity instances 420 are provided to the users, as described with regards to FIG. 3.

In some implementations, the dialog box 405 may be absent and one or more of the additional features of FIG. 4 may be implemented via a standalone application. For example, a user may indicate interest in being provided a set of activity instances by opening an application executing on the client device 105. The user can indicate, via the application, a time frame for activities, one or more activity type, one or more additional users that may participate in the activities, and/or additional information that may be utilized by one or more components of group activity engine 130 to provide one or more sets of activity instances.

Figure 5:
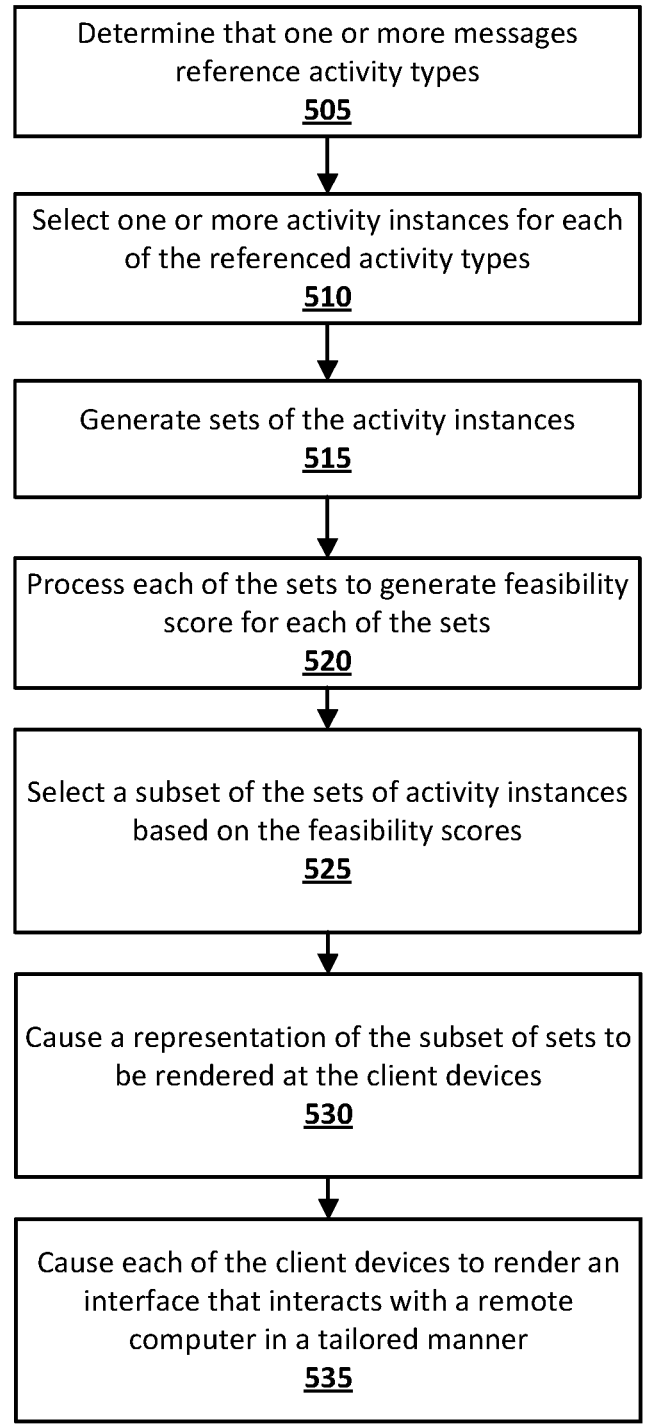
FIG. 5 illustrates a flowchart of an example method for determining a set of activity instances according to implementations described herein.

FIG. 5 illustrates a flowchart of an example method for determining an ordered set of activity instances according to implementations described herein. The steps of FIG. 5 can be performed by one or more processors, such as one or more processors of a client device. Other implementations may include additional steps than those illustrated in FIG. 5, may perform step(s) of FIG. 5 in a different order and/or in parallel, and/or may omit one or more of the steps of FIG. 5.

At step 505, references to a collection of activity types are determined from messages of a multi-user communication thread. The references may be determined by a component that shares one or more characteristics with message parser 115. In some implementations, one or more activity instances may be determined based on references in one or more of the messages. For example, an activity type (e.g., "dinner") may be referenced in a message and/or a specific restaurant may be referenced in one or more messages.

At step 510, one or more activity instances are selected for each of the referenced activity types. The activity instances may be selected by a component that shares one or more characteristics with activity selection engine 120. In some implementations, activity selection engine 120 can utilize a machine learning model to select one or more of the activity instances based on preference metrics of the users of the group. For example, for an activity type of "dinner," one or more restaurants may be selected based on user cuisine preferences, past visits to one or more restaurants, and/or one or more other indications of user preference in a restaurant.

At step 515, sets of activity instances are generated. The sets of activity instances can optionally be ordered based on, for example, times associated with each of the activity instances, locations of the activity instances, and/or one or more other features of the activity instances. Each of the sets includes one activity instance for each of the activity types referenced in the messages of the communication thread. For example, references to "dinner," "movie," and "hike" may be referenced in a communication thread and each of the sets can include one movie activity instance, one dinner activity instance, and one hike activity instance.

At step 520, the sets are each processed to generate a feasibility score for each of the sets. The feasibility scores may be generated by a component that shares one or more characteristics with activity set scoring engine 125. Activity set scoring engine 125 can utilize a machine learning model to generate the feasibility scores based on, for example, one or more features of the activity instances of a set. For example, one or more of the activity instances of a set may be associated with a time feature, a location feature, and/or an approval score that is indicative of user approval of the activity instance (as generated by the activity selection engine 120). In some implementations, one or more user preference metrics may be utilized to generate a feasibility score. For example, a feasibility score for a set of activity instances may be based on distance between a user "home" location and one or more of the activity instances and/or availability of one or more users and a time feature of one or more activity instances.

At step 525, a subset of the sets of activity instances is selected based on the feasibility scores of each of the sets. For example, a subset may be selected that includes sets with a feasibility score that satisfies a threshold, a predetermined number of sets, and/or a single set with the highest feasibility score.

At step 530, a representation of the subset of sets is rendered at the client devices of the users. The representation may include one or more features of the activity instances of the set(s). For example, a representation of a set may include a name (or other identifier) of each activity instance, a time, a location, and/or other information regarding the activity instance. In some implementations, one or more of the users may be prompted to select whether one or more sets is provided before the set(s) are provided to the user, e.g. as illustrated in FIG. 4.

At step 535, an interface is rendered by each of the client device that allows each user to interact with a remote computer in a manner tailored to the particular user. For example, each user may be prompted to purchase tickets for a movie that is an activity instance of one of the sets of activity instances rendered by the client device. Each user may have the option to purchase tickets via a remote computer that is associated with a ticket seller and, once confirmed, the tickets are purchased utilizing the payment information of the user.

Figure 6:
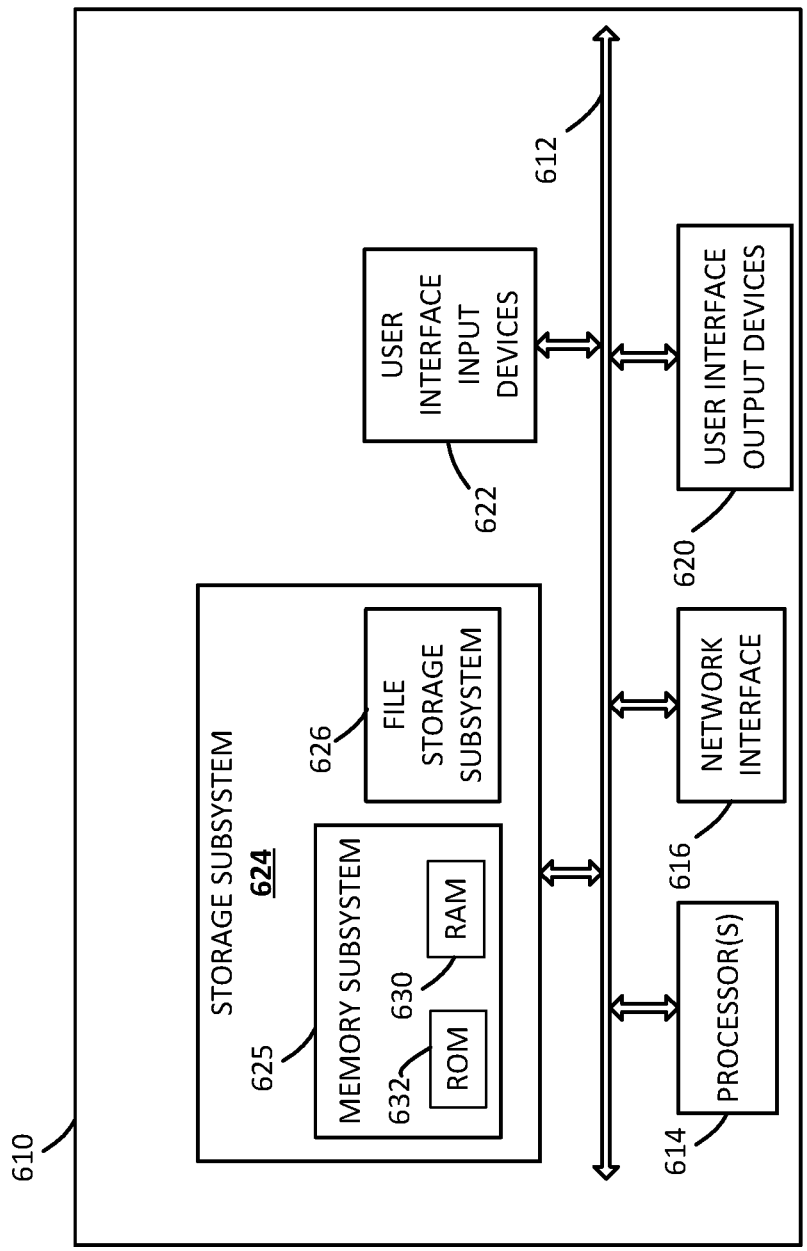
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   determining that one or more messages of an ongoing multi-user communications session reference a collection of activity types,
      wherein the determining is based on processing of content of the one or more messages of the ongoing multi-user communications session,
      wherein a plurality of users is participating in the multi-user communications session via respective client devices, and
      wherein the collection of activity types includes at least a first activity type and a second activity type;
   selecting one or more activity instances for each of the activity types of the collection, wherein selecting the one or more activity instances for each of the activity types of the collection is based on preference metrics for each of the users, and wherein the activity instances include multiple activity instances for the first activity type and multiple activity instances for the second activity type;
   generating a plurality of ordered sets of the activity instances, wherein each of the ordered sets of the activity instances includes a corresponding one of the activity instances for each of the activity types;
   for each ordered set of the activity instances, of the ordered sets of the activity instances:
      processing, using a trained machine learning model, respective features of the ordered set of the activity instances to generate a respective feasibility score for the ordered set of the ordered activity instances;
   selecting a subset of the ordered sets of the activity instances based on the feasibility scores, the subset including at least a given ordered set of the activity instances;
   causing, in response to the selecting, a representation of the given ordered set of the activity instances to be rendered at the client devices as part of the multi-user communications session; and
   in response to receiving at least one instance of affirmative user interface input responsive to the representation being rendered:
   causing each one of the client devices to render a respective interface element that, when selected, causes a respective one of the client devices to interact with at least one remote computer system in confirming at least one of the activity instances of the given ordered set of the activity instances, wherein the respective one of the client devices interacts with the remote computer system in a manner that is tailored to the respective one of the client devices to confirm the at least one activity instance for the respective user of the one of the client devices.

2. The method of claim 1, wherein the respective features for the activity instance of at least one of the activity types that is processed using the trained machine learning model includes a location feature that defines a geographic location for the activity instance.

3. The method of claim 1, wherein the respective features for the activity instance of at least one of the activity types that is processed using the trained machine learning model includes a temporal feature that defines one or more times for the activity instance.

4. The method of claim 1, further comprising:
identifying a location metric for at least one of the users; and
processing, using the trained machine learning model, the location metric along with the respective features of each of the ordered sets of the activity instances in generating the feasibility scores.

5. The method of claim 3, wherein each of the activity instances defines a respective activity and respective temporal information for the respective activity, and wherein selecting one or more activity instances for each of the activity types comprises:
identifying a temporal constraint of one of the users; and
excluding a conflicting activity instance from the selected activity instances based on the temporal constraint matching the respective temporal information of the conflicting activity instance.

6. The method of claim 5, wherein the temporal constraint of the one of the users is identified from an electronic calendar of the one of the users.

7. The method of claim 1, wherein the respective interface element that is caused to be rendered by one of the client devices, when selected, causes the one of the client devices to launch, with parameters for the at least one of the activity instances, an application installed on the one of the client devices, and wherein the application, when launched interfaces with the at least one remote computer system, using the parameters, in confirming the at least one of the activity instances of the given ordered set of the activity instances.

8. The method of claim 1, further comprising:
determining a supervised feasibility score for the given ordered set of the activity instances, wherein determining the supervised feasibility is based on one or both of:
whether at least one of the users performed the given ordered set of the activity instances, and
feedback provided by at least one of the users in response to rendering of a prompt that solicits feedback regarding the given ordered set of the activity instances; and
further training the machine learning model using a training example that includes training example input that conforms to the respective features for the given ordered set and that includes training example output that conforms to the supervised feasibility score.

9. The method of claim 8, wherein determining the supervised feasibility score is based on whether at least one of the users performed the given ordered set of the activity instances, and further comprising determining whether at least one of the users performed the given ordered set of the activity instances based on location information for at least one of the users.

10. The method of claim 1, further comprising:
identifying an indication of a specified activity in the communication thread; and
determining an additional activity type for the specified activity, wherein selecting one or more activity instances for each of the activity types of the collection includes selecting one or more activity instances for the additional activity type.

11. The method of claim 10, wherein the activity instances includes the specified activity.

12. The method of claim 1, wherein selecting the one or more activity instances for each of the activity types of the collection includes:
generating a plurality of first candidate activity instances based on a first activity type of the activity types of the collection;
processing, using a second machine learning model, one or more of the respective features of each of the candidate activity instances and the preference metrics of the users to generate a respective approval score for each of the candidate activity instances, wherein the respective approval score of a given candidate activity instance is indicative of overall approval of the given candidate activity instance by the plurality of users based on the preference metrics of the users; and
selecting one or more of the candidate activity instances based on the respective approval scores.

13. A method implemented by one or more processors, the method comprising:
determining a collection of activity types based on user interface input of one or more users of a group of users, wherein the collection of activity types includes at least a first activity type and a second activity type;
selecting one or more activity instances for each of the activity types of the collection, wherein selecting the one or more activity instances for each of the activity types of the collection is based on preference metrics for each of the users, and wherein the activity instances include multiple activity instances for the first activity type and multiple activity instances for the second activity type;
generating a plurality of sets of the activity instances, wherein each of the sets of the activity instances includes a corresponding one of the activity instances for each of the activity types;
for each set of the activity instances, of the sets of the activity instances:
processing, using a trained machine learning model, respective features of the set of the activity instances to generate a respective feasibility score for the set of the activity instances;
selecting a subset of the sets of the activity instances based on the feasibility scores, the subset including at least a given set of the activity instances;
causing, in response to the selecting, at least one client device of at least one of the users to render a representation of the given set of the activity instances.

14. The method of claim 13, wherein the user interface input is provided as part of an ongoing communications session between the group of users.

15. The method of claim 14, wherein causing the at least one client device to render the representation of the given set of the activity instances occurs without rendering the representation in a transcript in the ongoing communications session.

16. The method of claim 15, further comprising:
receiving affirmative user interface input responsive to the representation being rendered; and
in response to receiving affirmative user interface input responsive to the representation being rendered:
incorporating the representation, or an additional representation of the given set of the activity instances, into the transcript of the ongoing communications session.

17. The method of claim 13, wherein the respective features for the activity instance of at least one of the activity types that is processed using the trained machine learning model include:
a location feature that defines a geographic location for the activity instance, and a temporal feature that defines one or more times for the activity instance.

18. The method of claim 13, further comprising:

identifying a location metric for at least one of the users; and processing, using the trained machine learning model, the location metric along with the respective features of each of the ordered sets of the activity instances in generating the feasibility scores.

19. The method of claim 13, further comprising:

determining a supervised feasibility score for the given set of the activity instances, wherein determining the supervised feasibility is based on one or both of:

whether at least one of the users performed the given set of the activity instances, and feedback provided by at least one of the users in response to rendering of a prompt that solicits feedback regarding the given set of the activity instances; and further training the machine learning model using a training example that includes training example input that conforms to the respective features for the given ordered set and that includes training example output that conforms to the supervised feasibility score.

* * * * *